(12) United States Patent
Schaefer

(10) Patent No.: US 9,643,721 B2
(45) Date of Patent: May 9, 2017

(54) WIND ENERGY CONVERSION SYSTEMS, DEVICES, AND METHODS

(71) Applicant: David Brian Schaefer, Wilsonville, OR (US)

(72) Inventor: David Brian Schaefer, Wilsonville, OR (US)

( * ) Notice: Subject to any disclaimer, the term of this patent is extended or adjusted under 35 U.S.C. 154(b) by 0 days.

(21) Appl. No.: 14/643,200

(22) Filed: Mar. 10, 2015

(65) Prior Publication Data
US 2015/0251755 A1   Sep. 10, 2015

Related U.S. Application Data

(60) Provisional application No. 61/950,442, filed on Mar. 10, 2014.

(51) Int. Cl.
| | |
|---|---|
| *B64C 31/06* | (2006.01) |
| *B64C 39/02* | (2006.01) |
| *F03D 5/00* | (2006.01) |
| *F03D 9/00* | (2016.01) |
| *H02K 7/18* | (2006.01) |

(52) U.S. Cl.
CPC ............ *B64C 39/022* (2013.01); *B64C 31/06* (2013.01); *F03D 5/00* (2013.01); *F03D 9/002* (2013.01); *H02K 7/1853* (2013.01); *F05B 2240/917* (2013.01); *F05B 2240/92* (2013.01); *Y02E 10/70* (2013.01); *Y02E 10/725* (2013.01); *Y02E 10/728* (2013.01)

(58) Field of Classification Search
CPC .................................................... B64C 31/06
USPC ........................................ 244/153 R; 290/55
See application file for complete search history.

(56) References Cited

U.S. PATENT DOCUMENTS

| | | | | |
|---|---|---|---|---|
| 2,432,297 A | * | 12/1947 | Dowd ..................... | B64C 39/10 244/35 R |
| 3,924,827 A | | 12/1975 | Lois | |
| 3,987,987 A | | 10/1976 | Payne | |
| 4,251,040 A | * | 2/1981 | Loyd ..................... | B64C 39/022 244/1 R |
| 4,389,032 A | * | 6/1983 | Meckley ................ | A63H 27/08 244/153 R |

(Continued)

FOREIGN PATENT DOCUMENTS

| | | |
|---|---|---|
| EP | 0841480 B1 | 2/2002 |
| JP | 2004313673 A * | 11/2004 |

OTHER PUBLICATIONS

Loyd, Miles L., "Crosswind Kite Power," Journal of Energy, May-Jun. 1980, pp. 106-111, vol. 4 No. 3, Article No. 80-4075, American Institute of Aeronautics and Astronautics, VA.

(Continued)

*Primary Examiner* — Joseph Waks
(74) *Attorney, Agent, or Firm* — Hilde M. L. Coeckx; Apex Juris, PLLC

(57) ABSTRACT

Airborne devices for generating power in a crosswind power generating phase, including a body and at least one non-planar wing. A control system directs the airborne device to follow a predetermined flight path of increasing altitude during the crosswind power generating phase. Wind energy conversion systems and methods including an airborne device, a tether, a generator, and a control system that directs the airborne device to follow a predetermined flight path including a crosswind power generating phase.

22 Claims, 9 Drawing Sheets

(56) References Cited

U.S. PATENT DOCUMENTS

| | | | |
|---|---|---|---|
| 4,901,945 A * | 2/1990 | Hodgson | B64C 31/036 244/152 |
| 6,072,245 A | 6/2000 | Ockels | |
| 6,523,781 B2 * | 2/2003 | Ragner | A63H 27/002 244/153 R |
| 7,504,741 B2 | 3/2009 | Wrage | |
| 8,215,588 B2 | 7/2012 | Wrage | |
| 9,080,550 B2 * | 7/2015 | Goldstein | F03D 9/002 |
| 9,227,168 B1 * | 1/2016 | DeVaul | B01J 19/08 |
| 9,317,043 B2 * | 4/2016 | Jensen | B64C 39/022 |
| 9,429,954 B2 * | 8/2016 | Chubb | B64C 17/00 |
| 2007/0176432 A1 * | 8/2007 | Rolt | B64C 39/022 290/55 |
| 2008/0296905 A1 | 12/2008 | Ferguson | |
| 2010/0026007 A1 * | 2/2010 | Bevirt | B64C 31/06 290/55 |
| 2012/0104763 A1 | 5/2012 | Lind | |
| 2013/0134261 A1 | 5/2013 | Goldstein | |
| 2014/0246862 A1 | 9/2014 | Garcia-Sanz | |
| 2014/0326831 A1 | 11/2014 | Vander Lind | |
| 2015/0008678 A1 * | 1/2015 | Goldstein | F03D 5/02 290/55 |
| 2015/0097086 A1 | 4/2015 | Schaefer | |

OTHER PUBLICATIONS wikipedia.org, "Crosswind Kite Power," (http://en.wikipedia.org/wiki/Crosswind_kite_power), accessed Aug. 28, 2013, 10 pages.

wikipedia.org, "Laddermill," (http://en.wikipedia.org(wiki/Laddermill), accessed Aug. 28, 2013, 3 pages.

wikipedia.org, "Drag Polar," (http://en.wikipedia.org/wiki/Drag_Polar), accessed Sep. 7, 2013, 4 pages.

Breukels, Jeroen, "An Engineering Methodology for Kite Design," Thesis Technische Universiteit Delft, 2010, pp. 1-257, printyourthesis.com, Uitgeverij BOXPress, Netherlands.

U.S. Office Action dated Jul. 14, 2016, cited in U.S. Appl. No. 14/509,238, 7 pages.

U.S. Office Action dated Dec. 1, 2016, cited in U.S. Appl. No. 14/509,238, 7 pages.

* cited by examiner

WIND ENERGY CONVERSION SYSTEMS, DEVICES, AND METHODS

CROSS-REFERENCE TO RELATED APPLICATIONS

This application claims the benefit of U.S. Provisional Application Ser. No. 61/950,442, filed on Mar. 10, 2014, the disclosure of which is expressly incorporated herein by reference.

BACKGROUND

The present disclosure relates generally to airborne devices that convert energy during a crosswind power generating phase, and related wind energy conversion systems and methods.

To take advantage of the greater force of winds available at different altitudes, airborne devices have been developed that work at altitudes above the heights currently reached by ground-based wind turbines. Some of the existing airborne systems use tethered devices to generate power by flying into the wind or by flying crosswind.

Devices that fly into the wind typically have flight controls for two axes, i.e., one axis for pitch and one axis for roll, to keep the main wing parallel to the ground while the tether is let out from a ground winching device at a controlled speed. The wind forces the wing up creating a resulting force that is transmitted down the tether to a generator, to pump water, to turn a flywheel, or other energy conversion actions.

A crosswind flight path typically refers to a path followed by an airborne device wherein the wind has a component roughly perpendicular to the direction of travel, that is, the flight path can be separated into two components, a crosswind component and a headwind or tailwind component.

A crosswind motion of a wing is generally more efficient than a downwind motion because a crosswind motion allows the wing to fly many times the speed of the wind and harvest energy from an area that is many times larger than the area of the wing. When a wing moves in a plane normal to the wind vector, the apparent wind velocity becomes several times larger than the wind velocity itself. The crosswind motion generally results in higher forces generated in the tether compared to flying into the wind. Generally, crosswind kite speed is a function of the prevailing wind speed times the airborne device's net lift to drag ratio. However, existing crosswind devices typically require more complex control systems than devices that fly into the wind. For example, crosswind devices usually require controls for three axes, i.e., pitch, roll, and yaw, to follow a more complex fight pattern, such as a circular or figure eight pattern, during the energy generating portion of the flight path.

Known devices that use crosswind motion to increase force in a tether are described, for example, in U.S. Pat. No. 3,987,987 and in an article by Miles L. Loyd "Crosswind Kite Power," published in the Journal of Energy, Vol. 4, No. 3. May-June 1980. Variations of airborne wind energy conversion systems with a generator on the ground have been described. For example, U.S. Pat. No. 6,072,245 describes multiple airfoils that are connected to a single generator. The complete disclosures of the above patents are herein incorporated by reference for all purposes.

Known wind energy conversion systems, however, are not entirely satisfactory for the range of applications in which they are employed. For example, existing airborne wind energy conversion devices typically require complex systems using devices with a large turn radius when flying crosswind and consequently require a large surface area for operation.

Thus, there exists a need for airborne wind energy conversion systems, devices and methods that improve upon and advance the design of known devices, systems and methods.

SUMMARY

The present disclosure is directed to airborne devices, systems and methods for crosswind power generation. Some embodiments of the inventive subject matter are directed to airborne devices, such as an airborne wing, kite, or other wind engaging member. The airborne device is generally shaped to maximize a lift to drag ratio.

The inventive subject matter contemplates to maximize power generation (tether force times tether velocity), minimize projected land usage, and minimize cost and weight of the airborne elements. To optimize crosswind power generation, airborne devices according to the inventive subject matter have a compact design and a smaller turn radius than conventional devices. Use of the disclosed devices in wind farms leads to land usage that is smaller than the land usage required for traditional wind farms.

In some embodiments, an airborne device for generating power in a crosswind power generating phase includes a body, at least one non-planar wing, a coupling mechanism arranged to couple the airborne device to a tether, and an adjustment mechanism arranged to change a position of the at least one non-planar wing relative to the body allowing the airborne device to follow a predetermined flight path of increasing altitude during the crosswind power generating phase.

The inventive subject matter is also directed to a system for generating power during a crosswind power generating phase, including the above described airborne device and a control system arranged to direct the adjustment mechanism so that the airborne device is directed to follow a predetermined flight path of increasing altitude during the crosswind power generating phase.

The inventive subject matter contemplates a method for converting wind energy, including providing an airborne device for generating power during a crosswind power generating phase, the airborne device having a body, at least one non-planar wing including two or more wing segments that are approximately parallel and at least two interconnecting side segments. At least one non-planar wing is coupled to the body, and a coupling mechanism is arranged to couple the airborne device to a tether. A control system directs the airborne device to follow a predetermined flight path during the crosswind power generating phase. A tether is coupled to the airborne device via the coupling mechanism, and a generator is provided and coupled to the airborne device via the tether. Wind energy is captured with the airborne device during the crosswind power generating phase and transferred to the generator via the tether.

Further embodiments of the inventive subject matter include a system for generating power during a crosswind power generating phase, including an airborne device having at least one non-planar wing having two or more planar wing segments coupled via a side segment, a coupling mechanism arranged to couple the airborne device to a tether, and a control system arranged to direct the airborne device to follow a predetermined flight path of increasing altitude during the crosswind power generating phase and the flight path following a range of flight path that is less than about six times a wingspan of the device.

In some embodiments, a system for generating power during a crosswind power generating phase, includes an airborne device having a body, at least one non-planar wing coupled to the body and including an airfoil shaped segment having a leading edge and a trailing edge, and a propeller assembly coupled to the airborne device. A coupling mechanism is arranged to couple the airborne device to a tether. A control system directs the propeller assembly to generate forces that allow the airborne device to follow a flight path with the trailing edge of the at least one non-planar wing facing the direction of motion of the airborne device.

The inventive subject matter also contemplates a method for converting wind energy, including providing two or more airborne devices, each airborne device including a body, at least one non-planar wing, a coupling mechanism arranged to couple the airborne device to a tether, and a control system arranged to direct the airborne device to follow a predetermined flight path; coupling a tether to each of the airborne devices; providing a generator and operatively coupling the generator to the airborne devices via the tethers; coordinating flight paths of the airborne devices so that at a point in time at least one of the airborne device performs a crosswind power generating phase; capturing wind energy with the airborne device describing the power generating phase; transferring the captured wind energy to the generator via the tether coupled to the airborne device while performing the crosswind power generating phase; and repeating the power generation cycle so that the generator provides a continuous power supply.

These and other embodiments are described in more detail in the following detailed description and the figures. The foregoing is not intended to be an exhaustive list of embodiments and features of the inventive subject matter presently disclosed herein. Persons of ordinary skill in the relevant art are capable of appreciating other embodiments and features from the following detailed description in conjunction with the drawings.

Further features and advantages, as well as the structure and operation of various embodiments of the invention, are described in detail below with reference to the accompanying drawings.

DETAILED DESCRIPTION

The disclosed airborne wind energy conversion systems, devices, and methods will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various airborne wind energy conversion systems, devices, and methods are provided. It is understood that some of the figures are simplified views and not to scale. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The disclosed airborne devices include a body, a non-planar wing, and a coupling mechanism arranged to couple the airborne device to a tether. In some embodiments, an adjustment mechanism is arranged to change a position of the non-planar wing relative to the body so that the airborne device is configured to follow a predetermined flight path of increasing altitude during the crosswind power generating phase.

Figure 7:
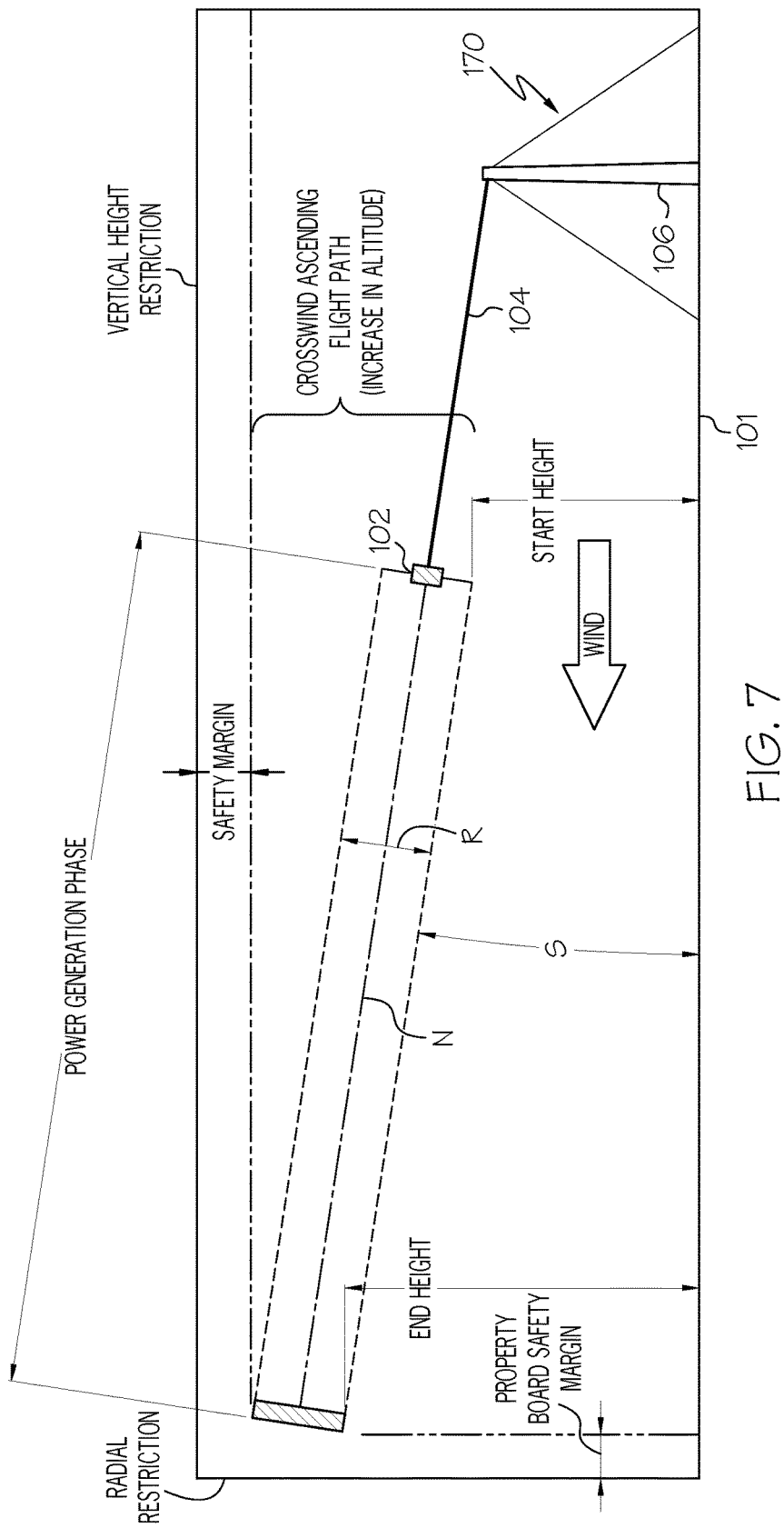
FIG. 7 is a simplified side view of an energy conversion system illustrating a crosswind flight path described by an airborne device.

As used herein the term "flight path" refers to the actual or planned course that the airborne device follows during a specific phase of a wind energy conversion cycle. The flight path changes several times during the wind energy conversion cycle. In some embodiments, the airborne device follows a flight path that increases in height during a power generating phase. For example, a commercially feasible flight range may start at a ground safety margin and end at an FAA safety margin, as illustrated in FIG. 7. In other embodiments, airborne devices may follow a flight path going up to 2000 feet or more, depending on the underlying area and flow of the land.

While following a crosswind flight path, the device produces high lift force in an attached tether whilst using a minimal vertical airspace for making turns. The device maneuvers mainly in a crosswind mode, except during take-off and landing, and a glide back mode or return phase where it is into the wind, as explained further below.

Directional terms such as "top", "bottom", "upper", "lower", "vertical" and "horizontal" are used in the following description for the purpose of providing relative reference only, and are not intended to suggest any limitations on how any apparatus is to be positioned during use, or to be mounted in an assembly or relative to an environment.

As used herein the term "non-planar wing" refers to any type of configuration or shape of a lifting surface that includes a geometry that differs from the generally planar, single straight wing. The term "wing" may refer, depending on context, to a lifting surface on either side of the main body or a lifting surface that runs on both sides of the body. For example, as used herein, a box wing includes two wings or wing sections in different planes that are joined structurally at or near the outside ends (tips) and at a central location. Other examples of non-planar wings include biplane wings, multi-plane wings, annular wings, annular box wings, joined wings, and the like. Some types may include a variable geometry, for example transitioning between different geometrical configurations. Non-planar wing designs generally stiffen the structure of the wing, reduce aerodynamic losses at the tips of the wings, and provide more lift area per a given wingspan than regular wing.

The aspect ratio of a wing refers to the ratio of the length of the wing to the breadth of the wing (chord). A high aspect ratio indicates long, narrow wings. A low aspect ratio indicates short, stubby wings. In the disclosed devices discussed below, the front non-planar wing, rear non-planar wing, or both have an aspect ratio between about 4 and about 10. This is in contrast to most airborne power generating systems which have aspect ratios similar to glider planes (sailplanes) ranging between 20 and 40. Hang gliders typically have aspect ratios between 4 and 8. General aviation aircraft usually have aspect ratios between 5 and 9.

Compared to conventional airborne device, the disclosed airborne devices have several advantages. For example, because of their compact design, the disclosed devices are able to handle stronger winds, which provides higher tether loads. The compact design also enables a simpler flight control system, provides more lift area per a given wingspan, and results in tighter turning radius during a power generating phase. A stronger wing allows the device to stay airborne during stronger winds, generating energy where existing systems would have to come down because of the stresses in the wings and body. Additionally, projected land usage contained directly below the flight path of the disclosed devices is minimized, and power generation capacity is maximized within a given area of land, because the disclosed airborne devices have a minimal turn radius.

Figure 3:
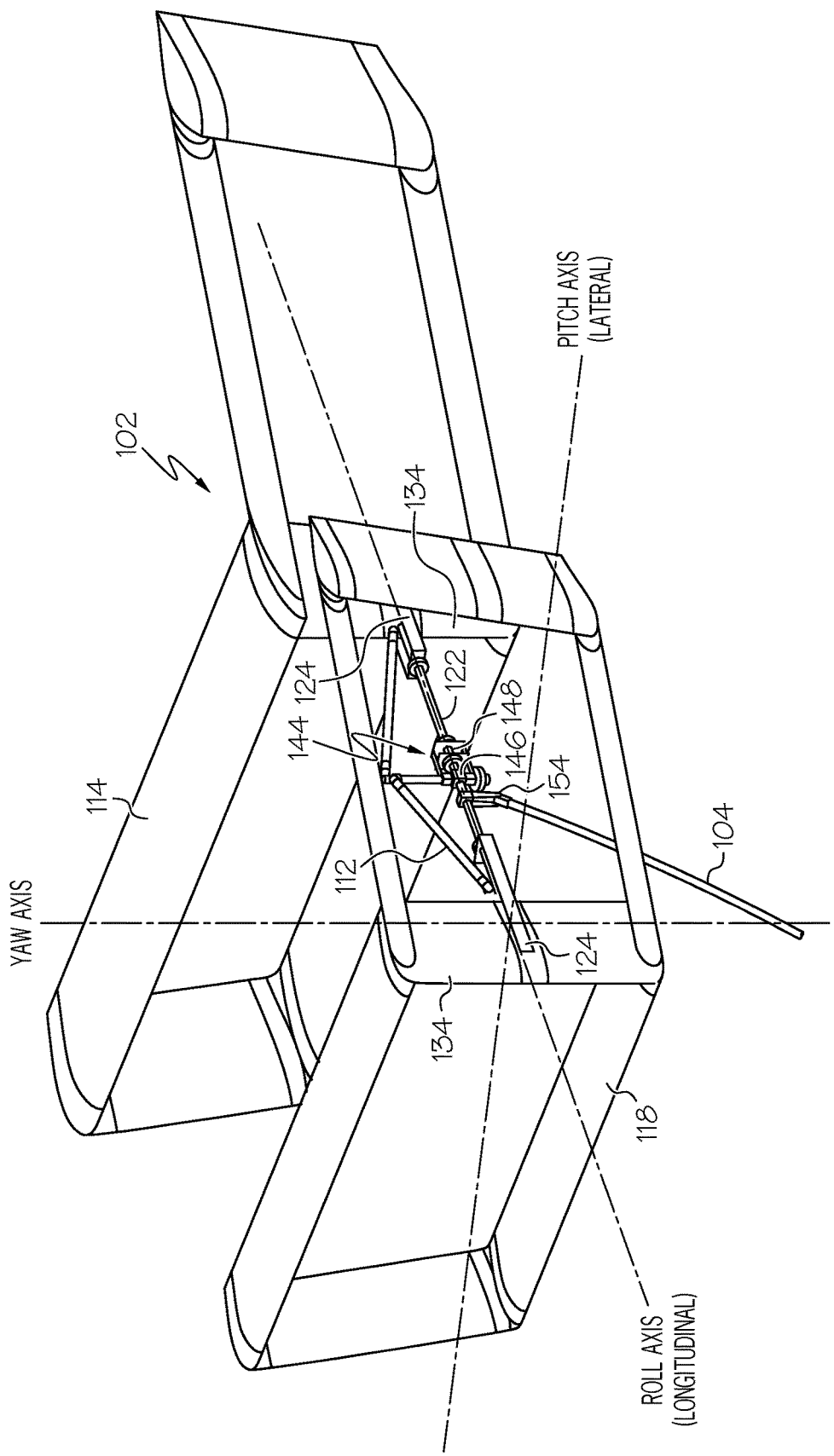
FIG. 3 is another perspective view of the airborne device of FIG. 1, showing details of the body.
Figure 4:
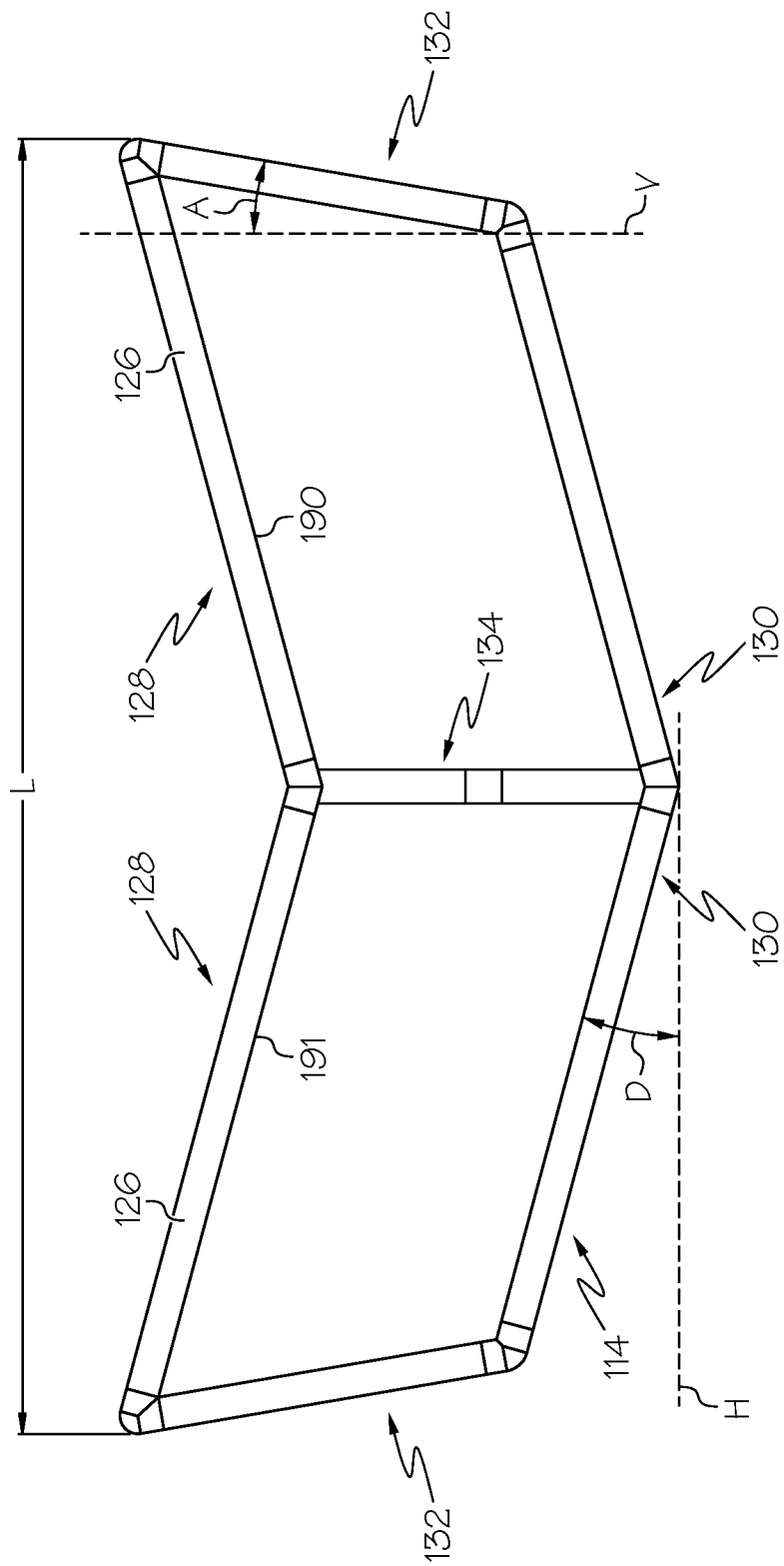
FIG. 4 is a front view of a box wing of the airborne device of FIG. 1.
Figure 5:
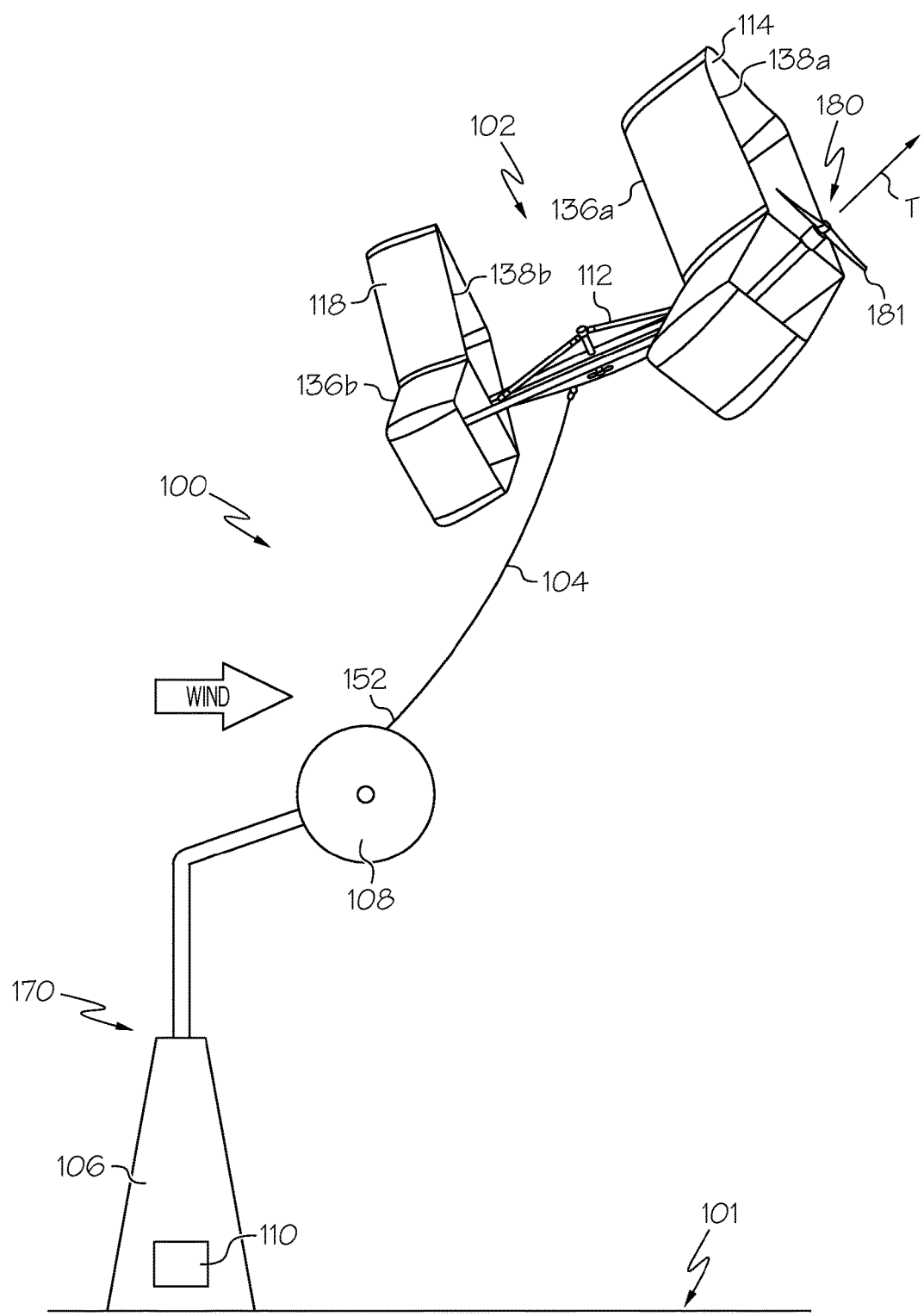
FIG. 5 is a side view of an energy conversion system with a launch and retrieval system for the airborne device of FIG. 1 provided with a propeller assembly.

With reference to FIGS. 1-7 an example of a wind energy conversion system and airborne device, will now be described. An airborne wind energy conversion system 100 includes an airborne device 102, a tether 104, a tower 106, a winching device 108, and a ground-level generator 110, for example as shown in FIG. 5. The system may further include a power inverter and energy storage system.

Airborne device 102 has a body 112 and two non-planar wings, shown as rear box wing 114 coupled to the body at one end 116 of the body 112, and front box wing 118 coupled to the opposite end 120 of the body 112. The arrow in FIG. 1 indicates the direction in which the airborne device moves during a crosswind power generating phase. The box-like structure of the wings has the benefit of increasing the lifting surface area compared to regular wings. In such a box wing type structure, wings in different planes are joined structurally at or near the distal ends of the wings and at a central location of the wings. The box wing structure stiffens the device structure so that the device is able to withstand higher stresses than the conventional devices. Additionally, the box wing structure reduce aerodynamic losses at the side ends.

Body

Figure 1:
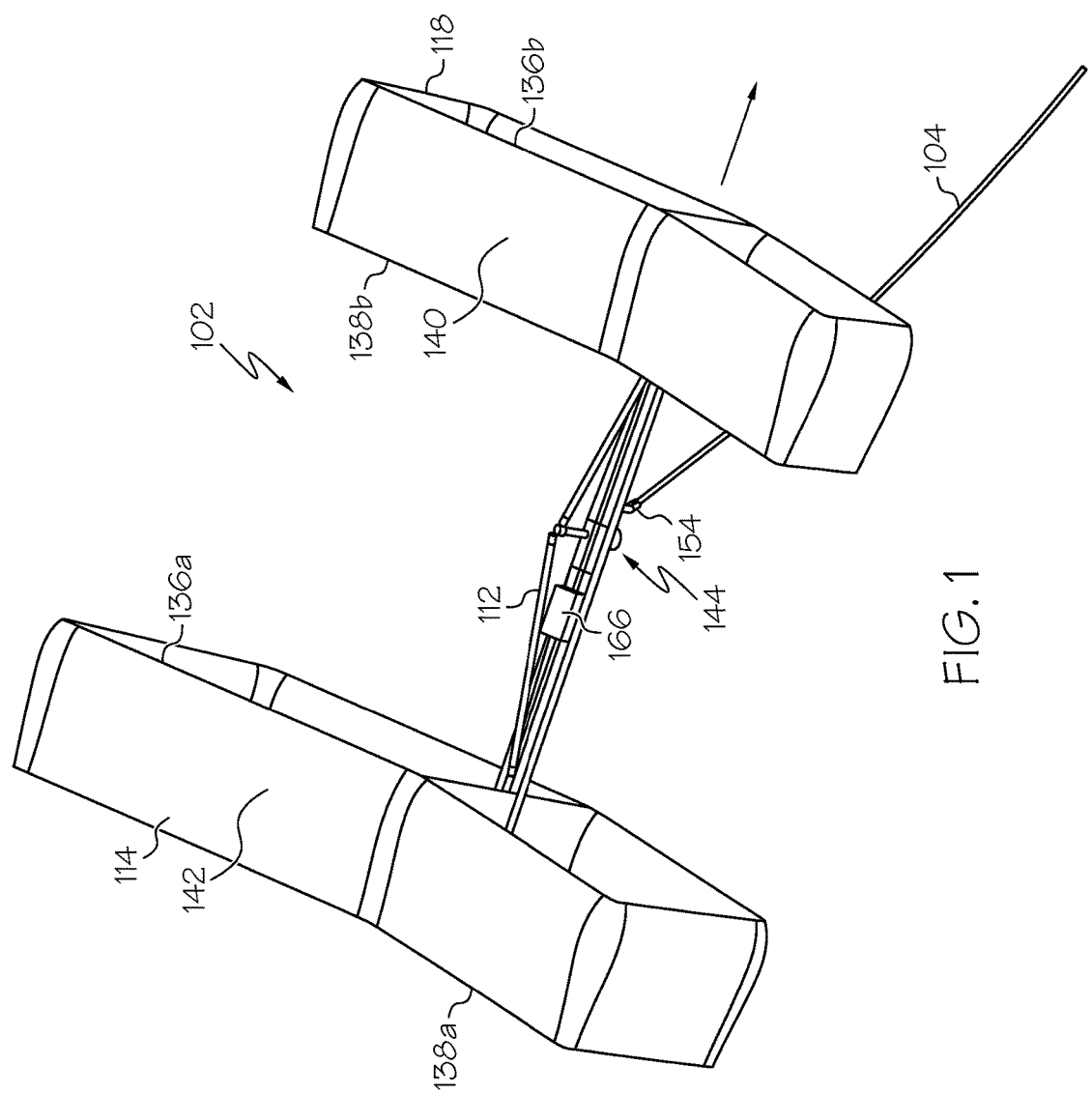
FIG. 1 is a perspective view of an example of an airborne device for converting wind energy.
Figure 2:
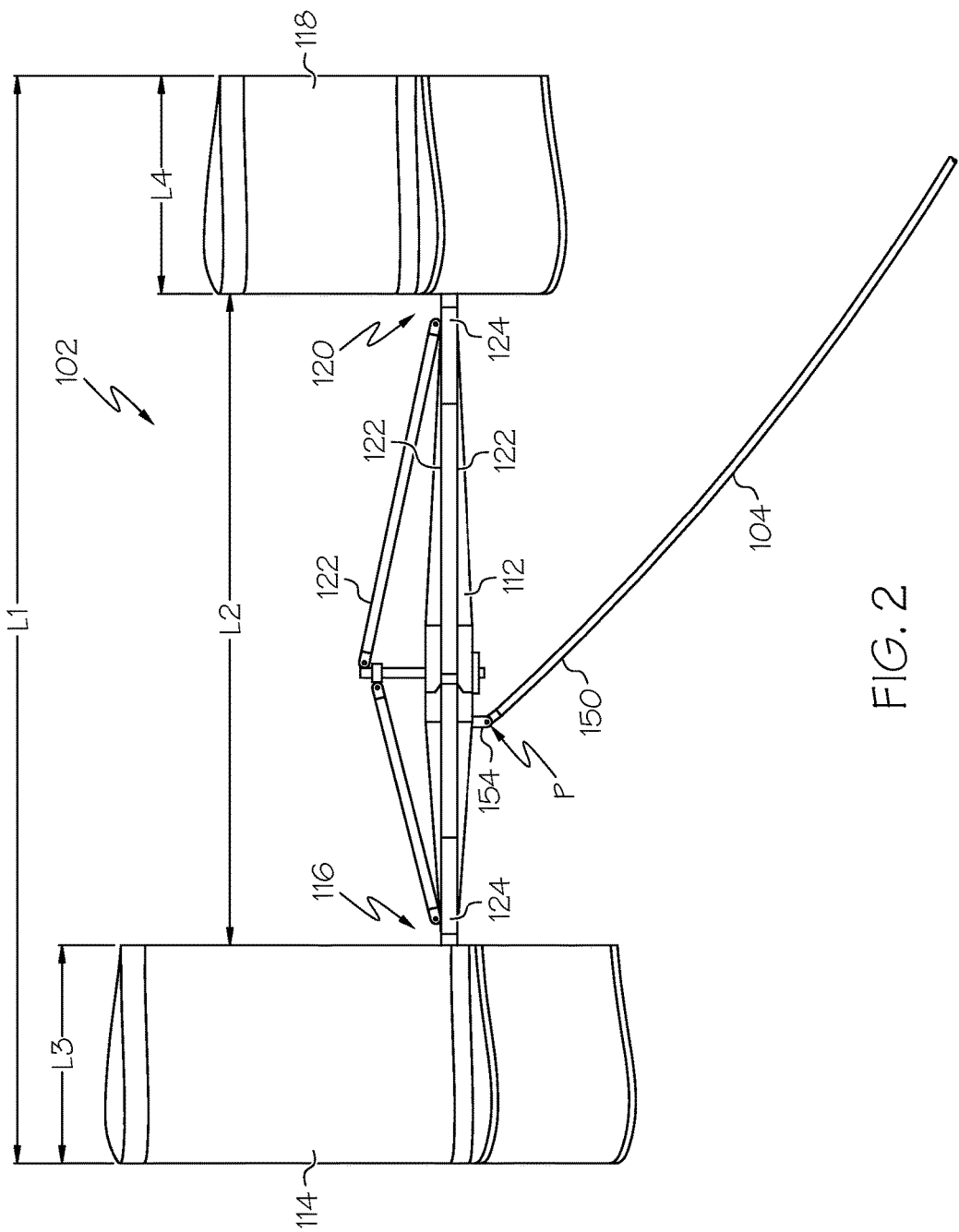
FIG. 2 is a side view of the airborne device of FIG. 1.

The body is an elongated member including a frame of support elements, such as rods or tubes. For example, FIGS. 1-3 show a body 112 wherein support elements 122 form a triangular body structure. At each opposite end of the body, support elements 122 are coupled to a U-shaped bracket 124 that is coupled to a support structure of the wings, for example center wing segment 134 for each respective wing. Body 122 is coupled to each wing 114, 118 at a location about midway the length L of the wings as shown in FIG. 4, and at the airfoil lift center or approximately 25% of the way back from the lead edge of the wing's chord. In some embodiments, the frame of the body may be covered with a casing or a housing surrounding the support elements either entirely or partially.

The body may be made of metal rods or tubes, for example made from aluminum with a composite skin that covers the rods. The skin may be made of carbon fiber, Kevlar, or other composite materials as understood by those of skill in the art.

FIG. 2 shows airborne device 102 having an overall length L1, body 112 having a length L2, rear box wing 114 having a length (chord) L3 and front box wing 118 having a length (chord) L4. General design considerations for determining the length of the body L2 include balancing a desire for a small turn radius with avoiding turbulence of the front wings to affect the rear wings.

Wings

FIG. 4 shows segments of box wing 114. Rear box wing 114 and front box wing 118 have a similar structure. Each of the box wings 114, 118 includes a left frame (left wing portion) 190 and a right frame (right wing portion) 191. Each frame 126 includes a top main wing segment 128 and a bottom main wing segment 130, extending substantially parallel in a longitudinal direction of the wing. The top wing segment 128 and the bottom wing segment 130 are joined by at least one connecting side wing segment 132. For example, FIG. 4 shows a right side wing segment and a left side wing segment joining the top wing segments and bottom wing segments of the right and left frames, respectively. The two frames are joined by a center wing segment 134 which is coupled to the body. Airborne device has a center front wing segment on front box wing 118 and a center rear wing segment on rear box wing 114. The frames and segments may be joined by, for example, by gluing together carbon fiber surfaces.

Side wing segments 132 connect the top wing segment 128 and the bottom wing segments 130 at an angle A relative to a vertical V, as shown in FIG. 4, such as an approximately 10 degree dihedral angle, to improve "self-centering" of the device during flight. The side wing segments 132 may have a dihedral angle ranging from about 0 degrees to about 15 degrees from a vertical. The center wing segment is positioned vertically between top and bottom wing segments. The side segments are symmetrical relative to the center wing segment.

In some embodiments, an airborne device is formed as a generally rigid wing structure, for example made of carbon fiber like a wing of a plane. A portion of a box wing may be constructed with a series of similar smaller portions, for example each portion made of a composite material such as carbon fiber to form one large rigid monocoque structure. To minimize weight, the inside of the portions is generally hollow. One example of a suitable wing is an Eppler 423 unsymmetrical airfoil. Flat wing segments could be approximately 48 to 52 inches in length and consistent with carbon fiber cloth material that is typically sold in 52 inch width. Flat wing segments and curved corner wing segments can all have the same outside airfoil shape. Inserts fit inside of flat wing segments and the curved wing segment, with a little gap for an epoxy bond between the inserts and wing segments. After the inserts are epoxied in place, and the epoxy cures, the box wing becomes one rigid structure.

Some embodiments may use symmetrical airfoils for side wing segments to create a lift force directed away from the ground via a positive angle of attack of the airfoil against the relative wind. As used herein, "relative wind" refers to an effective wind speed over the wing which creates lift and is based on summation of velocity vectors of the prevailing wind speed, tether release speed and wing speed relative to the ground. For example, each wing segment may be an airfoil having a symmetrical profile, such as for embodiments describing a zigzag pattern. In some embodiments, an airfoil like the Eppler 169 airfoil may be used.

In further embodiments, the top main wing, bottom main wing and side wings form one continuous monocoque structure that surrounds the body. The wing connection to the body at the center wing is aligned with the resultant of the wing aerodynamic lift force and aligned with the wing weight force. The wing connection is applied to the body in such a manner that the wing imparts no bending moment to the body around the pitch, roll or yaw axis. The body only supports the bi-wing weight and lift and drag forces generated. Since the uni-frame bi-wing supports all the cantilever bending loads, the body can be significantly smaller and lighter than in the conventional devices. For example the wings may have a monocoque structure, which refers to a type of construction in which the outer skin carries all or a major part of the stresses, i.e., a shell-like structure, using materials such light weight and high strength materials as carbon fiber, aluminum, Kevlar fiber.

An example embodiment of an airborne device 102 including a wing segment having a monocoque structure is shown in FIG. 1. Each wing 114, 118 may have a rounded leading edge 136*a*, 136*b* and a sharp trailing edge 138*a*, 138*b*. In other embodiments, the wings may have metal fittings and ribs attached to the inside and outside of a carbon fiber composite wing skin. In further embodiments the wing skins may have composite materials made of carbon fiber combined with other composite materials such as Kevlar.

In further embodiments, a wing may include a non-rigid wing surface (skin-over-frame design). For example, a non-rigid wing surface (such as made of nylon) over a rigid frame formed of unsymmetrical profile, for example in embodiments following a figure eight or circular flight pattern. In some embodiments, an unsymmetrical airfoil like the Eppler 423 or Clark Y airfoil could be used. The wings may include one or more spars, i.e., structural members running span wise extending from wing root to tip to control the airfoil shape. Ribs may be attached to the spars to share loads. Unsymmetrical airfoils may also be used for side wing segments in zigzag and circular flight paths with no or little positive angle of attack to create a lift force directed away from the ground. Generally, unsymmetrical side wing segments are less desired if a figure eight flight path is utilized.

In other embodiments, the airborne device may include a flexible wing (like many kite wings); a soft wing (like a sailboat's sail); an inflatable wing; an inflatable wing, inflated by the ram air, entering it through holes; a kite wing; a paraglider wing; a wing, using soft materials, spread over a rigid frame or cables; a wing made of elastic fabric, receiving airfoil form from relative air flow; and/or a mixed wing, using different construction techniques in different parts of the wing. In further embodiments, an airborne wing may be designed to accomplish a lift to drag ratio (L/D) larger than 10 at a specific angle of attack.

Airborne device 102 can be made of various materials, including carbon fiber, fiberglass, wood, aluminum, aramids, para-aramids, polyester, high molecular weight polyethylene, nylon and others. In some embodiments, an airborne wing may be provided with coatings, for example coatings resisting water impregnation, adhesion from snowfall, UV resistant coating, or radar absorbent material.

Some embodiments of the airborne device may have a foldable structure, for example the wing could utilize a foldable structure for portable applications with either a monocoque or tubular frame. For example, the front and rear wings may disconnect from the body.

In some embodiments, the airborne device includes box wings that are dihedral. For example, FIG. 4 shows box wing 114 having a dihedral angle, in particular a positive wing angle D relative to a horizontal H and giving the wings a generally shallow "V" shape when seen from the front. Angled wings may be advantageous when the device is describing a figure eight or circular flight pattern. Dihedral wings generally provide inherent stability in the roll direction. The main lifting wings are tilted up at an angle from the horizontal of approximately 15 degrees, for example when used for one sided figure eight or circular flight. When the wings are flat, the dihedral angle would be zero degrees.

In other embodiments, the airborne device may include wings that are flat or straight. In some embodiments, the device may have the ability to change the angle of the wings relative to a horizontal, allowing one device to perform both zigzag, figure eight and circular flight patterns with minor adjustments.

In some embodiments, airborne device 102 has wings that have a difference in perimeter and surface area, for example box wing 118 is smaller and has a perimeter that fits inside of wing 114 as seen from a side of the device. Such a configuration ensures both sets of wings get "clean" undisturbed air, i.e, such that the air turbulence that comes off the trail edge of the front wing does not hit the rear wings. It is understood that in some embodiments the larger wing can be considered a front wing, whereas in other embodiments the smaller wing can considered a front wing. Additional embodiments can include wings that have an offset between the alignment of front wings and back wings. In further embodiments, an airborne wing may have a specific design for example of wingtips to decrease turbulence and noise. In some embodiments, a rear wing may be larger than a front wing, for example so that the rear wing is able to handle the additional weight of the rear motor or propeller.

Additionally, in some embodiments the front top wing segments and front bottom wing segment may be further apart than the rear top and bottom wing segments. Further embodiments may include front left or right side wings that are narrower than the back left or right side wings. In general, any section of the box wing profile (top, bottom, left or right) could be offset from the corresponding wing section on the back wing, so the rear wing section gets clean (undistributed air) and is out of the wake of air turbulence that is generated off the trail edge of the front wing.

Airborne devices are contemplated herein to have any suitable dimensions. For example, an airborne wing can have a wingspan of about 10 feet, a total length of about 10 feet, a height of about 2 feet at a largest cross section of the body and about 4 inches at the body's smallest cross section. Such a device may weigh between about 15 lb to 20 lb. In other embodiments, an airborne device may have a wingspan of about 100 feet or more. Dimensions are given for illustrative purposes and are not intended to be limiting in any way.

The box wing structure includes left, center, and right side wing segments on both the front and rear wing assemblies which create a lift force that is directed away from the ground during cross wind flight, which increases the nominal tether angle. Compared to a typical single wing of a given wingspan, the box wing of the same wing span adds significantly more lift area. A lift force may be created from a desired combination of airfoil shape (symmetrical or unsymmetrical), angle of attack to the relative wind and the type of flight pattern. In some embodiments, a box wing structure can have side segments that are adjustable relative to the top and/or bottom wing segments to function as rudders.

Figure 6:
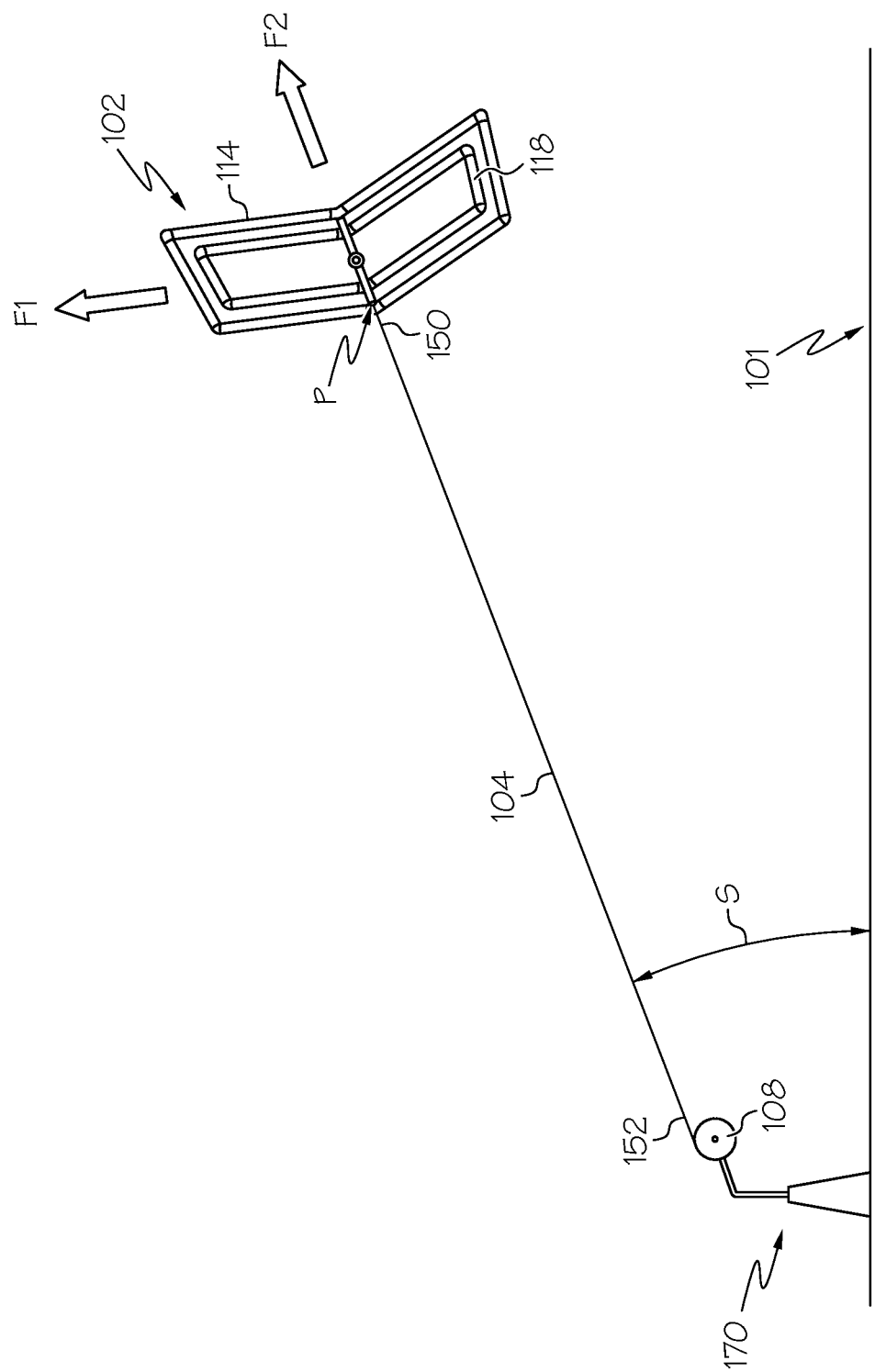
FIG. 6 is a side view of an energy conversion system and the airborne device of FIG. 1.

During a power generating cycle, adjustment of the angle of attack via the pitch axis control is desired in a zigzag flight path. In a figure eight flight path, yaw axis adjustment is desired. For a circular flight path, both a pitch and a yaw axis are adjusted. If a symmetrical airfoil, such as the Eppler E169, for the side wing segments is used, the airborne device yaw axis servo control may be used to turn the entire front and rear wing assemblies such that there is a positive angle of attack on the side wing segments versus the relative wind to create upwards lift away from the ground. For example, FIG. 6 illustrates forces on airborne device 102 flying at a nominal tether angle S between tether 104 and ground plane 101. Arrow F1 indicates the resulting direction of net lift force generated from the left, center, and side wing segments 132, 134 of device 102. Arrow F2 indicates the resulting direction of net lift force generated from the top and bottom main wing segments 128,130.

Adjustment Mechanism

An adjustment mechanism allows the airborne device to change direction during flight by adjusting the position(s) of portions of the device. In some embodiments, the adjustment mechanism shifts the position of each box wing independently relative to the body (pitch and yaw axis control), or the tether attachment point relative to the body (pitch and roll axis control). In other embodiments, the adjustment mechanism shifts portions of the body relative to each other. In further embodiments the adjustment mechanism includes a combination of adjustable features. A control system directs the adjustment mechanism so that a change in the flight path is accomplished by adjusting an angle of attack of at least one of the non-planar wings.

The embodiments described herein generally have no movable independent flight control surfaces within the exterior surfaces of the main wing segments, such as segments 128 and 130. The side wing segments, such as segments 132, 134, are rigidly attached to the main wing segments, and also have no movable independent flight control surfaces within the side wing segments. Alternatively, side wing segments can have a structural member internally, such as a round tube that connects directly to the top and bottom main wing segment, to form the box wing structure. The flight controls then pivot the side wing relative to the internal structural member, thereby making the entire side wing a control surface. The lack of control surfaces in the wings provides a much stronger wing capable of handling high wind loads. It also enables the device to stay aloft during these higher winds. For example, FIG. 1 shows an airborne device wherein the exterior surfaces 140 of box wing 114 and exterior surfaces 142 of box wing 118 are devoid of flight control surfaces. Control of the flight pattern is accomplished by pivoting the entire non-planar wing around an axis. In the example shown, an adjustment mechanism allows the wings to turn around a pitch axis or a yaw axis. Movement around a roll axis, also referred to as a longitudinal axis, may be accomplished, for example, by using a tether in combination with a cross member such as an elongated bar or other suitable structure extending from the body perpendicular to the roll axis and being controlled via the tether.

In some embodiments, turns around a yaw axis of device 102 are accomplished by front and rear wings each having a pivot that controls the angle of attack. FIGS. 1-3 show an adjustment mechanism 144 including pivotable element 146 under direction of a servo control system 148 for precise control of angular position of wings 114, 118 and body 112. A servo control system using a servo-motor as known in the art can be used. Pivotable element 146 is located about midway between the two wings. The entire wings 114, 118 pivot around a pitch axis to enable a quicker and smaller turn radius than conventional devices. A pitch axis pivot element is contained within the U-shaped bracket 124 and is located at about the center of lift of each of the wings 114, 118. The center of lift is usually located back ¼ of the wing chord length from the leading edge of the wing. By placing the wing pitch axis near the lift center, the moment applied by the flight control servo motor required to turn the wing around the lift center is minimized.

FIG. 3 shows a U-shaped bracket 124 of body 112 coupled to a center wing segment 134 of wing 114. The pivot is located at the center of lift of the wing to minimize the power required to turn the wing around the pitch axis. Optionally, the front and rear wing could have a mechanical link between the two adjustment mechanism such that one servo system could be used to move either wing or link and both wings would turn in unison.

In other embodiments, turns around a yaw axis are accomplished by turning both front and rear wings in about equal and opposite directions around a pivot point that is situated within the body, for example about midway the body between front and rear wing connections.

During performance of a figure eight flight path, an airborne device changes the position of wings relative to the body. In some sections of the flight path, the body of the device may be straight between the front and rear wing. The front wings 114 and rear wings 118 are generally perpendicular to the straight section of the figure eight flight path and parallel to each other. In other sections of the flight path, the body of the device is angled at the center. The front wings and rear wings have been turned an equal and opposite direction around the pitch axis such that the wings are directed towards the center of the turn radius, at an angle relative to each other.

Control System

The device further includes a control system arranged to communicate with the adjustment mechanism and other elements of the device to control the flight path. The control system ensures stable and coordinated movement of the device. The control system may be an autonomous onboard control system, an onboard control system that is in constant communication with a ground control system or a remote control system, or a control system that remotely directs movement of specific adjustment mechanisms of the device. In an example embodiment, a control system may be responsible for general operation of the airborne wing and transmit commands to the device. A control system of a wing may be responsible for generating commands to each adjustment mechanism of the wing. A control system may transmit data from its sensors to a remote control system. A control system may also manage the propeller assembly.

In some embodiments, a control system may include a plurality of subunits, either onboard or remote, that collaborate to direct the device through wind energy conversion cycles and related maneuvers. In further embodiments, several control systems may communicate with each other to coordinate flight paths and related maneuvers of multiple devices, for example as used in a wind farm.

FIG. 1 shows an onboard control system 166 that directs the device to follow a predetermined flight path and performing required maneuvers, such as a zigzag pattern and flipping of the device 180 degrees around a pith axis at turns in the flight path. Control system 166 can direct adjustment mechanism 144, for example via electric motors, to turn the device around a yaw axis or bracket 124 to turn the device around the pitch axis, thus changing the flight path of the device. In the disclosed embodiments, flight control of the main wing surfaces 128, 130 is generally accomplished by an adjustment mechanism outside of the exterior main wing segments. Flight control of the side wing segments 132, 134 can be accomplished by an adjustment mechanism outside of the exterior of the side wing segments or an adjustment mechanism between an internal structure member, within the side wing segments that connects the top and bottom main wing segments, and the exterior side wing segments.

Control system 166 may also communicate with a ground control system directing a uniform release speed of the tether during a power generating phase. Control system 166 may communicate with the adjustment mechanism to perform a turn or rotation of the device both around a pitch or yaw axis and around tether attachment point P.

In some embodiments, a control system may command three onboard servo control systems. For example, one on the front wing turns the entire front wing relative to the main body around the pitch axis, one on the rear wing turns the entire rear wing relative to the main body around the pitch axis, and a servomotor configured in approximately the middle of the main body turns the front half of the body and the front wing together as one around the yaw axis, and equal and opposite the direction of the rear half of the body and the rear wing which are also moved together as one unit. The servomotors allow precise control of angular position and typically include a sensor for position feedback. Examples of suitable servomotors are known in the art and commercially available. FIG. 3 shows an example of a servo motor with a gear system to control adjustment of the frame of the body around the yaw axis.

In other embodiments, a control system directs turning of the entire front wing and/or back wing via the adjustment mechanism to accomplish a turn in a power generating phase. The control system may include a central processor or a microcontroller, sensors, communication means for communication with the ground, and an energy source. Communication means may include a wireless network or communication wires accompanying the tether. Ground sensors may include an anemometer, barometer, radar, hygrometer, thermometer, GPS, cable tension meter, RPM meter, cameras for observing the wing and other. In some embodiments, one control system can serve multiple ground stations and wings. Optionally, a control system can be connected to the Internet to receive general weather information, for example warnings of extreme weather events. Sensors may include a speed meter, altimeter, accelerometer, gyroscopic sensor, GPS, stall warning device, compass, cameras, and other. In some embodiments, a control system may direct aircraft warning lights. The energy source can be, for example, an on-board battery or a small turbine, working from air flow, such as a propeller.

Tether

FIGS. 1-7 show airborne device 102 coupled to a single tether 104. Lift and drag forces as well as pitch moment are balanced around the tether attachment point in the pitch, roll and yaw axis. Tether 104 includes for example a cable, with an upper end 150 coupled to device 102 at a tether attachment point P, for example via a load cell and an universal coupling mechanism 154, and a lower end 152 coupled to winching device 108, for example a rotating drum or a capstan, at a ground station. Generally, the tether has a length sufficient to allow the device to reach a desired maximum predetermined height, for example a length sufficient for a device to reach a height limit at a desired operating angle of the nominal tether. In one example embodiments, a tether, for example a Dyneema® tether, may have a length of about 900 feet for an airborne wing with a wingspan of 80 feet, and a diameter of 1.4 inches based on a desired safety factor of 2 in a strong crosswind.

Generally, tether 104 is made of a material and construction that allows interactions with winching device 108, and that has strength to withstand forces produced. Additionally, tether material may be UV resistant and water resistant. For example a tether can be made of suitable materials such as Dyneema®, Kevlar™, Vectran®, Zylon®, and the like.

Upper end 150 of tether 104 is arranged to allow coupling of tether 104 to a coupling mechanism 154, for example at a central location of the body. As shown in FIGS. 1-3, coupling mechanism 154 is coupled to a support element 122 of body 112. Coupling mechanism 154 may include, for example, a swivel coupling provided with a load sensor.

In other embodiments, an airborne device may be coupled to a tether via a loop element so that the loop element is arranged to allow the body and non-planar wings to pass through the loop element when the device flips around the pitch axis.

FIGS. 5 and 6 show a lower end 152 of tether 104 coupled to a winching device 108, for example a drum that transfers rotation to a generator. Winching device 108 can be any mechanical device that is used to pull in (wind up) or let out (wind out) or otherwise adjust the tension of tether 104.

During a power generating phase, tether 104 unwinds from winching device 108 while rotating the winching device with force. During a glide back phase, winching device 108 can rotate in the opposite direction pulling tether 104 in and causing it to wind around the winching device, for example like a spool.

Examples of suitable winching devices may include a rotating drum, a capstan, a gear assembly, or other suitable device that is used to pull in or let out or otherwise tension the tether. In some embodiments, the winching device axis may be vertical. Other embodiments may include winching devices having a horizontal axis, or a combination of devices that are collaborating together to tension the tether. In further exemplary embodiments, a drum may have diameter large enough to keep mechanical stress in the tether below a material yield strength limit with a safety and keep the heat buildup in the tether below the tether material's operating range.

Optionally, two tethers may be coupled to a single aerodynamic device to eliminate the yaw axis servo system. Some embodiments include onboard energy generation, for example to support servo power, either via a propeller generator, which could also be used for assisted take-off, or by sharing of tether tension.

Ground Station

FIGS. 5-6 show airborne wind energy conversion system 100 having a ground station 170 located on the ground (or around the ground), and including a structure that guides tether 104 to winching device 108, for example, via a retaining ring, a hollow shaft, or an assembly of pulleys. Airborne device 102, has the ability to produce varying tether tension as a result of aerodynamic forces. At ground station 170, tether 104 is coupled, via winching device 108 to electrical generator 110 that forms part of ground station 170. When airborne wing 102 is travelling along a flight path, tether 104 unspools from winching device 108, consequently transferring mechanical energy to the electrical generator. The features of ground station 170 may depend on the terrain wherein the system is deployed, for example a ground station may be set up differently in a relatively flat terrain versus an area with rolling hills. A tower can be used for storage of the aerodynamic device and to minimize ground turbulence during launch of the device.

In other embodiments, a generator may be above a water surface, for example in the case of marine deployment. In further embodiments, on-site energy storage may be provided, for example in a battery, flywheel, or as compressed air. The system may also convert the motion energy provided by the tether to other forms of energy such pumping water, turning a flywheel, or convert sea water to hydrogen. A mechanical connection including a transmission may couple the winching device to a rotor of the generator, as known in the art. Beyond the generator on the ground, the electrical components of the system 100 may be similar to existing solar and wind installations.

Launch and Retrieval System

Optionally, the airborne device may include a system for launch and retrieval of the device. For example some devices may have a rear mounted motor or propeller assembly to aid in launch and retrieval of the airborne energy device. The propeller drives the device away from the platform. The airflow generated by the thrust of the propeller assembly during take-off and landing is opposite to that of convention aircraft systems. In a conventional system, air flows over the leading edge of the airfoil and exits over the trailing edge, which creates additional lift. In the disclosed embodiment, air flows over the trailing edge and exists over the leading edge and is not intended to generate lift from the airflow. Instead the propeller assembly thrust is generally directed away from the launch platform and is used to overcome the airborne device's weight and tether tension to move the device upwards away from the tower and generally downwind in a controlled manner. The propeller can be coupled to one of the wings or body at a suitable location.

Before launch, the airborne device may be resting on a platform of the tower with, for example, the body of the airborne device generally parallel to the ground. During launch the tether and connected airborne device are let out by unwinding the ground capstan drum and generate thrust from the propeller assembly.

FIG. 5 shows airborne device 102 equipped with a propeller system 180 mounted at wing 114. The on-board mounted propeller assembly is powered only during take-off and landing. The propeller assembly generates a thrust, in the direction indicated by arrow T, which pulls the airborne device generally down wind and upwards away from the ground based system tower. The thrust generated relative to the wing airfoil orientation is in a direction generally opposite to that of commercial aircraft and existing sky-gen airborne energy devices. In particular, upon activation of the propeller assembly, airborne device 102 moves opposite of a direction that would be expected based on the shape of an airfoil for a conventional device. In a conventional device, the device generally moves in a direction with the leading edge of the airfoil facing forward. In the disclosed embodiment, however, the airborne device, upon activation of the propeller assembly, moves forward with the trailing edge of the airfoil facing the direction in which the device moves forward.

The thrust direction of the propeller 181 is generally directed upward at a nominal tether angle of about 30 degrees to about 70 degrees. This process continues until the device is positioned at an elevation from the ground where aerodynamic lift generated by the apparent wind speed over the device wings can support the weight of the device and hanging tether. At that point the motor and propeller system is turned off.

During retrieval, the opposite process happens, the propeller assembly is turned on below a certain altitude or speed (required for adequate lift) creating additional and consistent tension in the tether which is overcome by the ground capstan drum drive such that the device is winched back into the tower at a predictable position to engage a device retention system (not shown) for storage.

In some embodiments, the propeller assembly is rigidly attached to the wing assembly, such that adjusting the angle of attack of the wing via a pitch axis control system can aim the thrust vector in an optimal position for launching and landing the device.

In other embodiments, a propeller may serve a dual purpose, such as being used for take-off/landing and on-board energy generation for the flight control system, aircraft lighting, and aircraft-like transponder system. For example, a propeller may be powered via on-board batteries for take-off and landing. In some embodiments, solar panels may be mounted on swing surfaces to provide on-board energy. In other embodiments, two counter rotating propellers may be used to balance torque around the roll axis.

In flight, the propeller system could be driven backwards by the wind such that acts as a generator, for example similar to existing airborne energy generation systems to generate on-board power for the flight control systems. In some embodiments, the propeller assembly could be powered slightly as needed to make adjustments to the flight path, either to advance or retard the airborne device's position in the flight path.

Power Generation

The disclosed devices are arranged to follow a predetermined flight path. In some embodiments, the device may describe a figure eight or circular pattern during the crosswind power generating phase wherein the device follows a flight path performing sharper turns (requiring smaller turn radii) than the conventional devices. For example, the control system may direct the device to turns around the yaw axis and some minor amount around the roll axis for figure eight and circular flight. In other example embodiments, the aerodynamic device follows a zigzag pattern during a crosswind power generating phase (also referred to as crosswind power generating mode). At a turn in the zigzag pattern, the device turns 180 degrees relative to the tether so that a portion of the device facing the tether before a turn, faces away from the tether after the turn and a portion of the device facing away from the tether before the turn faces the tether after the turn. At a subsequent turn, the device will repeat the turn maneuver in the opposite direction. Alternating the direction of turning of the device results in a zigzag flight pattern. In some example embodiment, aerodynamic devices are adapted to perform both figure eight type, circular type, and zigzag type patterns of flight paths.

Generally, during the crosswind power generating mode and between turns, the device increases in height. During this phase, most of the power is generated by the airborne device while the front and rear wings are at a positive angle of attack against the relative wind. At a positive angle of attack, the leading edge of the chord line of a wing is above the line representing the relative wind. A positive angle of attack produces tension in the tether. In a crosswind power generating phase, the complete turn-over of the device or a figure eight pattern with small turn radius minimizes the turn radius at each turn and thus minimizes the vertical airspace required for performing that turn for a device with a given wingspan, and also minimizes the vertical airspace used by the device for the entire crosswind flight path during the power generating phase.

In some embodiments, a complete turn-over of the device around a pitch axis is accomplished by the entire back wing turning around the front wing. In that case, turning the entire lifting surface minimizes the turn radius, prevents loss of angular momentum, and reduces time in a low energy production mode at each turn. In other embodiments, a turn-over around a pitch axis may be accomplished by pivoting front and/or back side wings.

FIG. 7 illustrates device 102 flown at a low angle to produce useful work, for example at an angle between about 20 degrees and about 50 degrees, downwind of ground station 170. High airspeed over the surfaces of aerodynamic device 102 creates a force that pulls on tether 104. Tether 104 is let out by ground station 170 at a rate dependent on the absolute magnitude of the wind speed and the physical limitations of a generator.

The wind energy conversion cycle starts with a release phase wherein the aerodynamic device leaves the tower, drifts straight out away from the wind, for example in a simple kite mode, with the side wings being substantially parallel to the ground (no turning). This move is only done once during launch of the device and once during retrieval of the device (for example during excessively high winds, no wind, or maintenance). The length of this cycle depends on the size of the wing and of the flight pattern, which determines the range of the flight path.

After the device is launched from its ground station, for example provided with a tower 106, tether 104 is let out in a controlled manner while the device is acting as an "into the wind" energy generating system. A suitable tether release speed would be about ½ of the wind speed. A minimum tether length is released from the winching device at the ground station before the wing can begin its first flight maneuver. The minimum tether length ensures there is adequate ground clearance, with a safety margin, at the bottom of the maneuver to the wing tip.

The next phase of the wind energy conversion cycle is a crosswind power generating phase, i.e., a figure eight pattern or zigzag power mode starts when the wing can turn crosswind and begin the pattern with assurance that the bottom wing tip would clear the ground with some safety margin. For example, data from various sensors may be analyzed to determine the wing's position and performance, and flight control systems may adjust surface controls to keep the wing flying along a pre-determined path with the optimum amount of lift force. The airborne device follows a crosswind flight path in a plane that is substantially perpendicular to the tether or at a small angle relative to the tether (such as less than 10 degrees caused by variation in the flight control system that would be targeting a perpendicular angle). During this phase the wing is actively pulling the tether. For example, a suitable tether release speed may be ⅓ of the wind speed.

The nominal position, i.e., the theoretical average position, of the tether during the power generating phase as used with the device may range between about 20 degrees and about 50 degrees off the ground, for example FIG. 7 shows a nominal tether angle S of about 30 degrees for a nominal flight path N having a range of flight path R with airborne device 102. Typically a turn radius of a conventional aircraft around the yaw axis is generally 2.5 to 4.0 times its wingspan. The range of flight envelop R, which encompassed the outer wingtip in a turn is two times the turn radius plus the wingspan or about 6 to 9 times the wingspan respectively.

FIG. 7 illustrates that the power generating phase starts at a predetermined height (start height) and ends at a predetermined height (end height). The predetermined start height relates to the wingspan of the airborne wing so that the airborne wing has enough clearance to make the directed turns. For example, a start height for the crosswind power generating mode for a wing with a wingspan of about 80 feet, tower height and ground safety margin of about 30 feet and nominal tether angle of about 30 degrees, would be after releasing about 69 feet of tether in the disclosed device whereas it would be at about 415 feet of a tether in conventional systems.

At the opposite end of the power generating phase, there is a maximum tether length that can be released from the ground system to ensure the wing tip during its maneuver does not exceed a given height restriction, with a safety margin on the top side, of the maneuver. The crosswind flight pattern ends when the top wing tips reach upper height limitations, for example a maximum height imposed by the Federal Aviation Administration (FAA), such as about 499 feet (about 150 m) above ground level, minus some safety margin, for example of about 30 feet. It is understood that a FAA height limitation may be a restriction for commercial embodiments in some areas, however, some embodiments may operate above and below the upper height limitation.

The energy conversion cycle ends with a turn-to-power phase. Similar to turn-to-glide, the wing could roll 90 degrees and yaw 90 degrees, before a new cycle can start.

Additional Embodiments

In a further embodiment, an airborne device includes an adjustment mechanism having a cross member and a short front and rear tether loop that joints the single tether that comes up from the ground system. A coupling mechanism can include a cross member and two tether loops, for example a front tether loop and a rear tether loop. The cross member may be coupled to the body at a central location between the wings or slightly off the center towards a front box wing, for example at a position where it does not interfere with a functioning adjustment mechanism. The cross member may be a tubular structure similar to the body, for example an elongated bar of a material similar as the frame of the body and positioned with a length generally perpendicular to the length of the body. The cross member can have an aerodynamic shape that reduces drag. In some embodiments, the cross member may have a surface area with aerodynamic shape that generates lift. In other embodiments, the cross member is an integral part of the body.

The cross member ensures that the body of the airborne device is constrained around the roll axis via the front tether loop and the rear tether loop. The coupling mechanism will constrain the body of the airborne device around the pitch axis.

In other embodiments, both wings can be turned independently around a pitch axis such that the wings are approximately parallel and have a positive angle of attack relative versus the prevailing wind, for example in a position wherein a front wing and a rear wing are both tilted at approximately the same angle relative to the body, however, in different directions relative to body. Both wings can be turned independently around a pitch axis such that the front wing has a positive angle of attack and the rear wing has a negative angle of attack.

In another alternative embodiment, an airborne device including a cross member can be coupled to a two tether system for doing figure eight and circular flight patterns. Such a two tether system can replace the servo motor control system for the yaw axis described above. The yaw axis is typically the most used (highest duty cycle) control axis during figure eight flights. A two tether system requires two drums on the ground, one for each tether, which are controlled independently. Generally, moving the tethers in or out over the same amount changes the distance between the ground station and the airborne element and does not impact the yaw or pitch axis steering. The two tethers can move independently of each other (equal and opposite to control steering around the yaw axis) and because of the tether loop constraint, any movement of the airborne element as a result of doing differential yaw axis steering on the angle of attack of the airborne element (movement around the pitch axis is minimized).

In another alternative embodiment, an airborne device includes straight box wings and a cross member coupled to a single tether via a tether loop system for doing zigzag flight patterns. When taking turns during the zigzag flight pattern, the rear box wing passes through the loop element of the loop system. Such device can follow a zigzag flight path of increasing altitude up to a certain height where the device glides back to a lower starting point and starts the power generating phase over again. In some embodiments, a tether loop system can be reduced in size by coupling the tether to the airborne device via a cross member, for example at a central location of the body of the airborne device In other embodiments, a loop element may be coupled to opposing wing tips of for example a front wing, and to a single tether so that loop element allows the device to turn around freely around the pitch axis. This changes the loading on the side wing to have two end constraints (tether attachment points) with an opposing uniformly distributed aerodynamic lift force. In further embodiments, a loop element configuration may allow multiple wing systems to be stacked on a single tether.

Reduction of Fluctuations in Energy Supply

The inventive subject matter further contemplates to solve the problem of erratic power generation typically encountered in conventional airborne wind energy systems. Conventional ground generation based airborne wind energy systems have high power generation variability between the power generation phase, which consists of many repetitive flight paths in a figure eight or circular pattern where the airborne devices pull downwind continuously to a target altitude, and a singular return phase where the airborne flyer is feathering upwind back to the start of the power generation phase. Conventional ground generation systems use devices that follow a path flying outward continuously, in a cork-screw pattern outwards (out of plane), and thus generate power between two positions repeatedly until a target altitude is reached, followed by a singular return phase back to the start of the power generation phase. The power generation phase of a corkscrew cycle out to maximum height at the end and subsequent glide back into the wind causes an erratic duty cycle of power generation.

Figure 8:
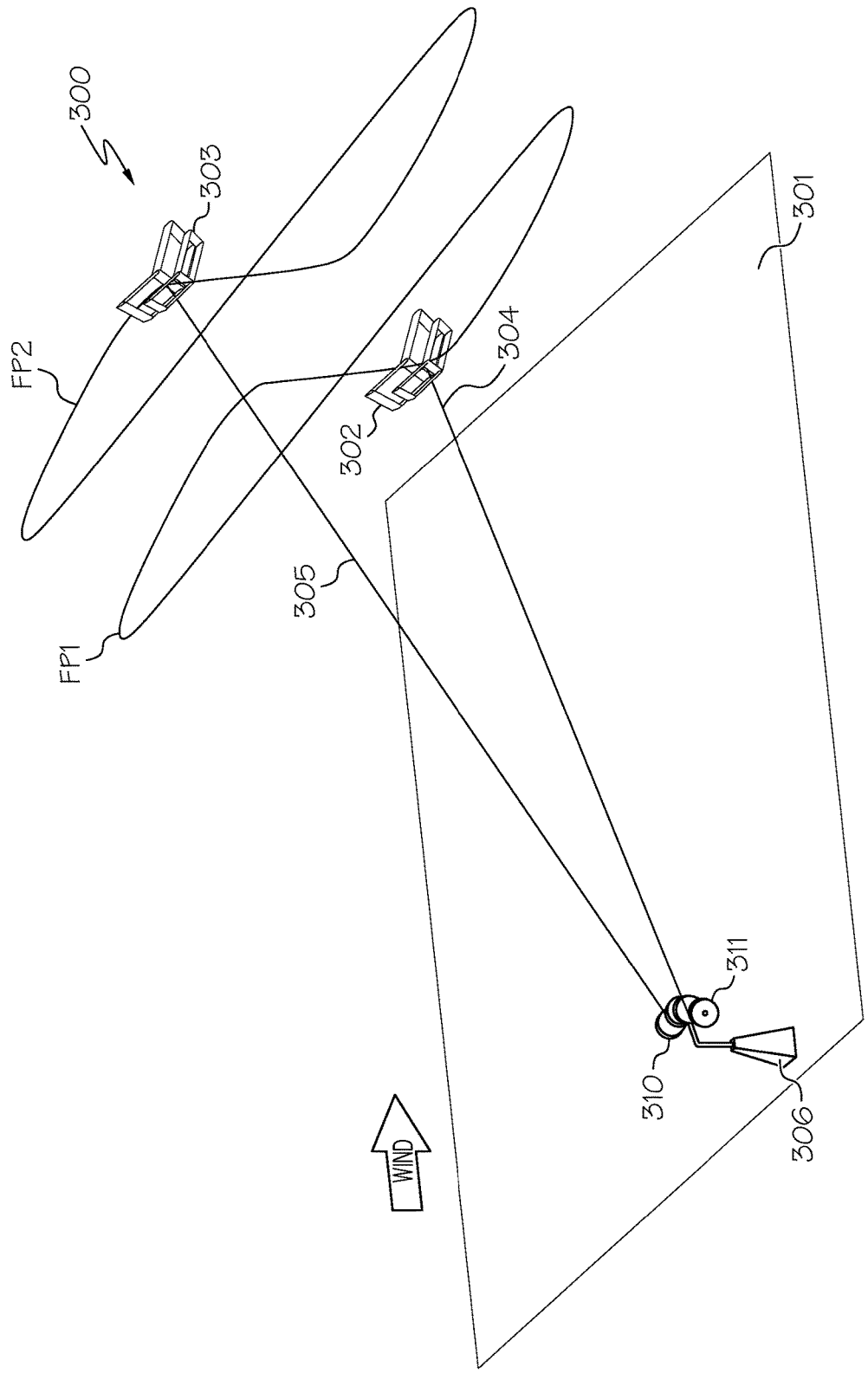
FIG. 8 is a perspective view of possible flight paths of two airborne devices in a system for converting wind energy.

FIG. 8 shows a wind energy conversion system 300 including one or more airborne devices, for example two airborne devices 302 and 303, used to provide a continuous power supply or at least reduce fluctuation in the average power level generated. Once enough tether has been released to start a crosswind Mobius figure eight flight path, such as flight paths FP1 or FP2, the amount of tether released during the power generating phase of the crosswind power cycle is equal to the amount of tether that must be withdrawn on the return cycle. In this embodiment, the net tether movement is zero during the power generating phase which is significantly less distance than the tether movement during the crosswind power generation phase shown in FIG. 7 using a single device system. The reduced crosswind power generation distance performed during the Mobius figure eight flight path enables placing the devices at an altitude with the best winds, likely at the highest altitude. In addition, the Mobius figure eight flight path generally requires simple pitch and yaw control to maintain the flight path and only requires the more complicated flight controls required for the turn to power and turn to glide maneuvers when there is insufficient winds to keep the device aloft, whereas with the single device systems these maneuvers are done every cycle.

FIG. 8 also show that each device is coupled to a separate and unique tether for each airborne device, such as tethers 304 and 305 coupled to devices 302 and 303 respectively. In this embodiment, both airborne devices 302, 303 are linked to a single ground station 306 including a generator and tower.

Upon release, two airborne devices 302, 303 leave the tower and drift downwind independently to follow their respective flight paths FP1 and FP2 above ground plane 301. For example, flight paths FP1 and FP2 are describing a Mobius figure eight pattern. In other embodiment, the flight path could be a circular pattern. When a desired amount of tether is spooled out from the capstan drums 310, 311, both airborne devices 302, 303 begin the desired crosswind flight path. The flight of airborne devices 302, 303 is coordinated to avoid collision. Drums 310, 311 can rotate independently on their rotational axis to control tethers 304 and 305 respectively. A tower is allowed to rotate freely on a tower rotational axis to follow the crosswind flight of the devices. The drum assembly is allowed to freely rotate approximately 90 degrees around the drum assembly's rotational axis to prevent the two tether lines from becoming tangled.

Flight of airborne devices 302, 303 is coordinated such that the devices are each following a flight path that is approximately 180 degrees out of phase with the other. The devices follow the same nominal flight path but are offset in phase and distance from the tower and ground station. Both airborne devices follow the same target flight path over and over, in alternating phases. Each flight path FP1 and FP2 is approximately in a plane that has a curvature where the radius is the tether length and the center is at the tower.

During the power generating phase of airborne device 302, the device pulls away from the tower as a result of the main wing surfaces of the front and back wing assemblies of device 302 having a positive angle of attack on the front and rear wing assemblies against the apparent wind speed which generates an aerodynamic lift force that is transmitted to the attached tether 304. A gravitational force is also acting downward on device 302. As tether 304 is pulled away from the tower, drum 311 turns which in turns spins an electrical generator.

When airborne device 302 enters the return phase of flight path FP1, and the angle of attack of the main wing surfaces on the front and rear wing assemblies is changed to have a negative angle of attack with the apparent wind, and front and back wing assemblies are turned in opposites directions around the yaw axis which causes the device to turn and follow a downward path resulting in a loss of tether tension. Subsequently, flight path FP1 includes a second power generating phase and a second return phase before airborne device 302 has completed a complete cycle of flight path FP1. Flight paths FP1 and FP2 are coordinated between airborne devices 302 and 303 such that while airborne device 302 is in a power generating phase, airborne device 303 will be in a return phase and vice versa.

To spin a drum when an airborne device on that drum is in the return phase, minimal power could be applied to this drum via a separate motor drive or by reversing the electrical polarity on the drum generator, to take up the tether slack. Optionally, some power could be drawn from the other drum which is in the power generating phase (via an even number of gears and a one-way clutch/bearing as tether distance released during the power phase is equal and opposite the tether withdrawn during the return phase).

The objective of controlling the spacing of airborne devices 302 and 303, and of possible additional devices that are positioned on additional flight paths emanating from the same tower, is to produce a more consistent power delivery of the system composed of multiple flyers with coordinated flight.

To control the spacing between airborne devices 302, 303, excursions from the flight path, and or lift or drag adjustments of the airfoils of airborne devices 302, 303 can be utilized to increase or decrease the spacing to achieve an ideal distance or flight path synchronization. Also a propeller assembly could be used to make adjustments to the flight path, for example to either advance or retard the airborne device's position in the flight path.

In a further embodiment, two or more airborne devices could be operating on the same generator so that the devices are operating out of phase with each other during the power generation phase and during the return phase to reduce fluctuation in the average power level generated. In other words, the two devices alternate between a power generating phase and a return phase so that at any given time one device is in a power generating phase and the other device is in the return phase. Such arrangement reduces fluctuation in the average power level generated.

In other embodiments, the power generating phase of the flight path of each airborne device can be substantially similar to the power generating phase described for the airborne devices above.

In another embodiment, a wind energy conversion system can use a single airborne device on one flight path, either circular or figure eight flight path, where the distance between a front wing assembly and a rear wing assembly of the device is controlled by a joining body having a length equal to a distance for each wing to follow a productive flight path. Two tethers could be utilized, one connecting to the front wing assembly and one connecting to the rear wing assembly. The angle of attack of the front and rear wing assemblies would then be controlled independently to enable pitch axis movement of the wing assemblies approximately equal and opposite to each other.

There are several advantages to the wind energy conversion systems according to the inventive subject matter. For example, the disclosed systems provide more consistent power generation (which is reducing variation from the overall average power generation level), reduce or eliminate the need for any electrical energy leveling devices, such as batteries or mechanical energy leveling means such as a high inertia flywheel.

Additionally, the disclosed systems produce higher average power generation capacity for a given land space as multiple devices generate power on a given tower and the projected land space the airborne devices flies over.

Furthermore, the disclosed systems enable additional flexibility in the tether design in the working section of the tether that is wrapped around the drum during the power generation phase. During the working section, in conventional systems the tether experiences the greatest heat generation, wear and material stress in current ground generation based airborne energy systems. In the disclosed systems, the length of the tether may be reduced significantly. For example, most tether ropes are naturally round over the entire length, whereas the working tether length of the system disclosed here could be a wide flat tether and differently shaped tether near the airborne device where the additional aerodynamic drag caused by a flat tether would not be desired.

Moreover, the disclosed wind energy conversion system enables greater flexibility in the section of the tether from the drum to the airborne device, outside the work section, where aircraft warning flags or aerodynamic drag reducing elements could be added to the tether. Permanently adding these items to a working section of the tether would not be desired so they are typically added (clipped on) to the tether as it is actively spooled out, and actively removed as the tether spools in on each power cycle where the tether can extend and retract up to several hundred to several thousand feet.

Wind Farm Layout

The inventive subject matter further contemplates a method for optimizing wind farm layout by providing a plurality of wind energy conversion systems, for example as a plurality of the systems described above, each provided with a tower. The aerodynamic device of each of the plurality of wind energy conversion systems includes an airborne wing with a predetermined wingspan and a predetermined turn radius. A minimum spacing is determined between the towers of the plurality of wind energy conversion systems based on the wingspan and the turn radius. Airborne devices according to the inventive subject matter describing a figure eight pattern perform a range of flight path that is less than about six times the wingspan of the device. Airborne devices according to the inventive subject matter describing a zigzag pattern require a range of flight path that is about 1 time the wingspan of the device. Wind energy conversion systems using the disclosed airborne device can be arranged in a layout that optimizes land usage. In some embodiments, control systems may coordinate flight paths between different airborne devices to achieve optimal results in energy production and optimal land usage.

Figure 9:
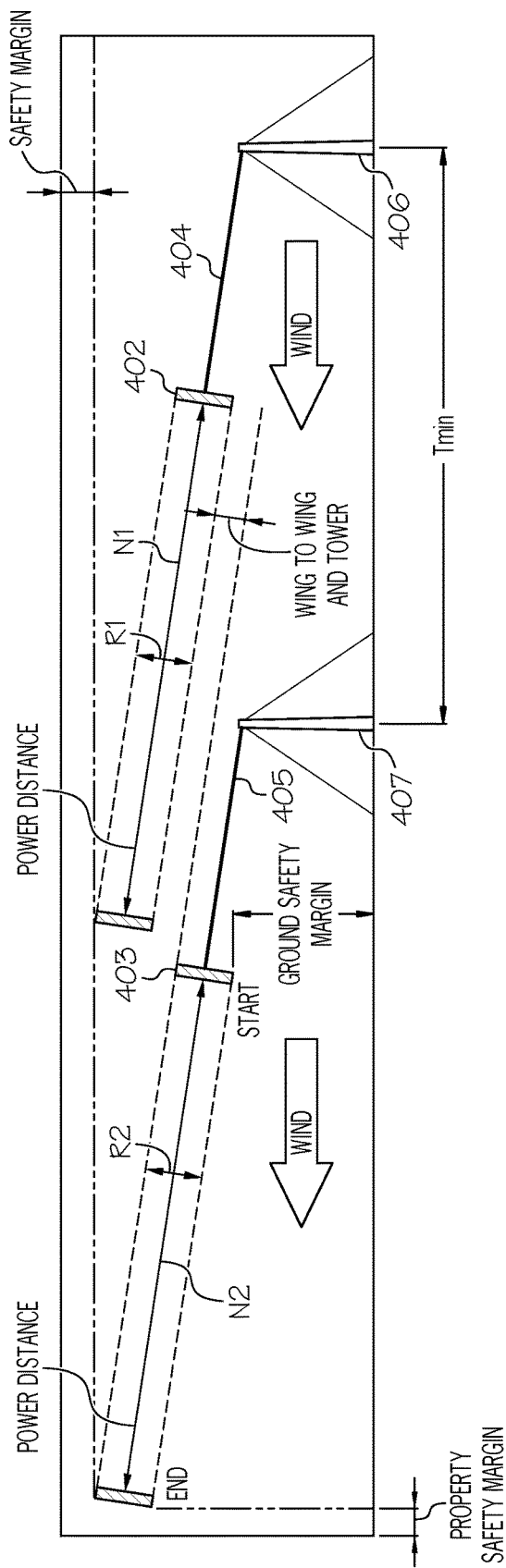
FIG. 9 is a simplified side view of a layout for a wind farm using the disclosed airborne devices.

FIG. 9 illustrates an example layout for a wind farm using a plurality of the above described systems and devices. For example, towers 406 and 407 are spaced from each other at a predetermined minimum tower spacing Tmin. Airborne devices 402, 403 are coupled to their respective towers 406, 407 via their respective tethers 404 and 405. Each airborne device 302, 303 follows a predetermined flight path having a range R1, R2 around nominal flight paths N1 and N2. Individual systems may operate autonomously or in coordination with neighboring systems.

In some embodiments, for example using devices having a wingspan of about 10 feet, a tower height of 30 feet, and a 30 degree nominal tether angle, may have a minimum tower spacing of about 80 feet, whereas a conventional system with similar dimensions would require about 180 feet. Optionally, corner property markers for example in the form of balloons, ground markings, or radio transponders, may be used to mark the corners of the wind farm.

The inventive subject matter is further directed to a method for optimizing wind farm layout, for example by providing a plurality of wind energy conversion systems as described above and provided with a tower. The airborne wing of each of the plurality of wind energy conversion systems includes a predetermined wingspan and a predetermined turn radius. A minimum spacing between the towers of the plurality of wind energy conversion systems is determined based on the wingspan and the turn radius of the airborne wing. The wind energy conversion systems are arranged in a layout that optimizes land usage.

Additional advantages of the disclosed systems include small and portable technology, for example some embodiments may weigh less than 50 lb, and launch and retrieval when needed.

The inventive subject matter also contemplates a kit including an airborne device and a tether. For example, a kit may include an airborne device and a tether as described above. Other applications of devices and systems according to the inventive subject matter may include sporting kites, such as used for wind surfing or ski surfing. Further applications may include systems that form a driving energy source for an engine-less transport wing system where the driven device could be a balloon or an airborne craft where the angle of attack is controlled to add a drag force that is necessary for the disclosed device to generate maximum propulsion power to the driven device.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and sub-combinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and sub-combinations of the disclosed inventions that are believed to be novel and non-obvious. Inventions embodied in other combinations and sub-combinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

All patent and non-patent literature cited herein is hereby incorporated by references in its entirety for all purposes.

What is claimed is:

1. An airborne device for generating power in a crosswind power generating phase, comprising:
    a body;
    at least one non-planar wing including at least two wing segments and at least two interconnecting side segments, the at least two wing segments extending substantially parallel to each other and positioned at a positive dihedral angle relative to a horizontal;
    a coupling mechanism arranged to couple the airborne device to a tether;
    an adjustment mechanism arranged to change a position of the at least two side segments of the at least one non-planar wing relative to the body allowing the airborne device to follow a predetermined flight path of increasing altitude during the crosswind power generating phase; and
    wherein the side segments are configured to generate aerodynamic lift in a direction substantially perpendicular to an actual flight path when the airborne device is directed to make turns during the crosswind power generating phase.

2. The device of claim 1, wherein the at least one non-planar wings has an aspect ratio between about 4 and about 10.

3. The device of claim 1, wherein a front non-planar wing is coupled to one end of the body and a rear non-planar wing is coupled to an opposite end of the body.

4. The device of claim 1, wherein exterior surfaces of the at least one non-planar wing are devoid of flight control surfaces.

5. The device of claim 1, further comprising a propeller assembly to aid in launch and retrieval of the device so that the propeller assembly operates in conjunction with the tether to control movement of the device by generating forces that allow the airborne device to follow a flight path with a trailing edge of the at least one non-planar wing facing the direction of motion of the airborne device during launch and retrieval.

6. The device of claim 1, wherein the at least two interconnecting side segments are at a dihedral angle relative to a vertical.

7. The device of claim 1, wherein the at least one non-planar wing has a chord length that is about constant along a length of the at least one wing.

8. The device of claim 1, wherein the at least one non-planar wing includes a rigid uni-frame structure such that no bending loads are transferred to the body.

9. A system for generating power during a crosswind power generating phase, comprising:
    an airborne device including a body;
    at least one non-planar wing coupled to the body, the at least one non-planar wing including at least two wing segments and at least two interconnecting side segments, the at least two wing segments extending substantially parallel to each other and positioned at a positive dihedral angle relative to a horizontal;
    a coupling mechanism arranged to couple the airborne device to a tether;
    an adjustment mechanism arranged to change a position of the at least two side segments of the at least one non-planar wing relative to the body;
    a control system arranged to direct the adjustment mechanism so that the airborne device is directed to follow a predetermined flight path of increasing altitude during the crosswind power generating phase; and
    wherein the side segments are configured to generate aerodynamic lift in a direction substantially perpendicular to an actual flight path when the airborne device is directed to make turns during the crosswind power generating phase.

10. The system of claim 9, wherein the predetermined flight path during the crosswind power generating phase has a range of flight path that is less than about six times a wingspan of the device.

11. The system of claim 9, further comprising a front non-planar wing coupled to one end of the body, and a rear non-planar wing coupled to an opposite end of the body.

12. A method for converting wind energy, comprising:
    providing an airborne device for generating power during a crosswind power generating phase, the airborne device comprising: a body; at least one non-planar wing including at least two wing segments and at least two interconnecting side segments, the at least two wing segments extending substantially parallel to each other and positioned at a positive dihedral angle relative to a horizontal, and the at least one non-planar wing is coupled to the body; and a coupling mechanism arranged to couple the airborne device to a tether;

installing a control system to direct the airborne device to follow a predetermined flight path during the crosswind power generating phase;

coupling the tether to the airborne device via the coupling mechanism;

installing a generator and coupling the generator to the airborne device via the tether;

capturing wind energy with the airborne device during the crosswind power generating phase; and transferring the captured wind energy to the generator via the tether.

13. The method of claim 12, wherein the predetermined flight path during the crosswind power generating phase has a range of flight path that is less than about six times a wingspan of the device.

14. The method of claim 12, wherein the airborne device further comprises a propeller assembly and wherein the control system directs the propeller assembly to generate forces that allow the airborne device to follow a flight path with a trailing edge of the at least one non-planar wing facing the direction of motion of the airborne device.

15. The method of claim 12, further comprising providing the airborne device with an adjustment mechanism arranged to change a position of the at least one non-planar wing relative to the body.

16. A system for generating power during a crosswind power generating phase, comprising:

an airborne device including at least one non-planar wing including at least two wing segments and at least two interconnecting side segments, the at least two wing segments extending substantially parallel to each other and positioned at a positive dihedral angle relative to a horizontal;

a coupling mechanism arranged to couple the airborne device to a tether; and a control system arranged to direct the airborne device to follow a predetermined flight path of increasing altitude during the crosswind power generating phase and the flight path following a range of flight path that is less than about six times a wingspan of the device.

17. The system of claim 16, further comprising a propeller assembly.

18. A system for generating power during a crosswind power generating phase, comprising:

an airborne device including a body;

at least one non-planar wing coupled to the body including at least two wing segments and at least two interconnecting side segments, the at least two wing segments extending substantially parallel to each other and positioned at a positive dihedral angle relative to a horizontal, and including an airfoil shaped segment having a leading edge and a trailing edge;

a propeller assembly coupled to the airborne device;

a coupling mechanism arranged to couple the airborne device to a tether; and a control system directing the propeller assembly to generate forces that allow the airborne device to follow a flight path with the trailing edge of the at least one non-planar wing facing the direction of motion of the airborne device.

19. The system of claim 18, wherein the control system instructs the airborne device to follow a predetermined flight path of increasing altitude during the crosswind power generating phase.

20. The system of claim 18, wherein the predetermined flight path during the crosswind power generating phase has a range of flight path that is less than about six times a wingspan of the device.

21. A method for converting wind energy, comprising:

providing two or more airborne devices, each airborne device comprising a body, at least one non-planar wing, a coupling mechanism arranged to couple the airborne device to a tether, and a control system arranged to direct the airborne device to follow a predetermined flight path;

coupling a tether to each of the airborne devices;

providing a generator and operatively coupling the generator to the airborne devices via the tethers; coordinating flight paths of the airborne devices so that at a point in time at least one of the airborne device performs a crosswind power generating phase; capturing wind energy with the airborne device describing the power generating phase;

transferring the captured wind energy to the generator via the tether coupled to the airborne device while performing the crosswind power generating phase;

repeating the power generation cycle so that the generator provides a continuous power supply; and wherein the amount of tether released during the crosswind power generating phase is equal to the amount of tether withdrawn on the return cycle, such that the net tether movement is zero during one power generating cycle.

22. The method of claim 21, wherein two or more airborne devices are operating with tethers on the same generator so that the airborne devices are operating out of phase to each other in the power generation phase and a return phase to reduce fluctuation in the average power level generated.

* * * * *